United States Patent
Angell et al.

(10) Patent No.: US 10,713,606 B2
(45) Date of Patent: *Jul. 14, 2020

(54) COMPARING UTILITY AND WARRANTY OF SERVICES

(71) Applicant: International Business Machines Corporation, Armonk, NY (US)

(72) Inventors: Robert L. Angell, Salt Lake City, UT (US); Timothy Durniak, Poughkeepsie, NY (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,674

(22) Filed: Jul. 2, 2019

(65) Prior Publication Data
US 2019/0325369 A1    Oct. 24, 2019

Related U.S. Application Data

(63) Continuation of application No. 15/256,825, filed on Sep. 6, 2016, now Pat. No. 10,380,525, which is a
(Continued)

(51) Int. Cl.
*G06Q 10/00* (2012.01)
*G06Q 10/06* (2012.01)
*G06Q 90/00* (2006.01)

(52) U.S. Cl.
CPC ..... *G06Q 10/06315* (2013.01); *G06Q 10/063* (2013.01); *G06Q 10/067* (2013.01); *G06Q 10/0639* (2013.01); *G06Q 90/00* (2013.01)

(58) Field of Classification Search
CPC .......... G06Q 10/063; G06Q 10/0639; G06Q 10/067; G06Q 10/06315; G06Q 90/00
See application file for complete search history.

(56) References Cited

U.S. PATENT DOCUMENTS

| 7,284,054 B2 | 10/2007 | Radhakrishnan |
| 9,483,746 B2 | 11/2016 | Angell et al. |

(Continued)

FOREIGN PATENT DOCUMENTS

| JP | 10-143274 A | 5/1998 |
| JP | 2004-103014 A | 4/2004 |

(Continued)

OTHER PUBLICATIONS

USPTO Notice of Allowance and Fee(s) Due, U.S. Appl. No. 12/610,999, dated Jul. 7, 2016, 16 pages.
(Continued)

*Primary Examiner* — William S Brockington, III
(74) *Attorney, Agent, or Firm* — Jay Wahlquist; Maxine L. Barasch; Keohane & D'Alessandro PLLC

(57) ABSTRACT

An invention for comparing utility and warranty of services in an information (IT) stack is provided. Embodiments of this invention are directed to comparing utility and warranty of services in an information technology (IT) stack comprising a plurality of layers, at least one of the plurality of layers having a set of services. In these embodiments, a utility and warranty tool provides this capability. Specifically, the utility and warranty tool comprises a determination component configured to determine, at each layer of the IT stack, a required utility and warranty (RUW) value for each of the set of services, wherein the RUW value represents a desired solution for implementing a business process; and determine, at each layer of the IT stack, an available utility and warranty (AUW) value for each of the set of services, wherein the AUW value is a measure of an ability of each (Continued)

of the set of services to satisfy the RUW at each layer of the IT stack. The utility and warranty tool further comprises a comparison component configured to compare the RUW value against the AUW value at each layer of the IT stack to determine whether each of the set of services satisfies the desired solution for implementing the business process.

20 Claims, 5 Drawing Sheets

Related U.S. Application Data continuation of application No. 12/610,999, filed on Nov. 2, 2009, now Pat. No. 9,483,746.

(56) References Cited

U.S. PATENT DOCUMENTS

| | | |
|---|---|---|
| 2002/0010667 A1 | 1/2002 | Kant et al. |
| 2002/0016835 A1 | 2/2002 | Gamerman |
| 2003/0195783 A1 | 10/2003 | Greenstein |
| 2004/0186905 A1 | 9/2004 | Young et al. |
| 2005/0102665 A1 | 5/2005 | Barta et al. |
| 2005/0125768 A1 | 6/2005 | Wong et al. |
| 2006/0031110 A1 | 2/2006 | Benbassat et al. |
| 2007/0073576 A1 | 3/2007 | Connors et al. |
| 2007/0130208 A1 | 6/2007 | Bornhoevd et al. |
| 2007/0156919 A1 | 7/2007 | Potti et al. |
| 2007/0294364 A1 | 12/2007 | Mohindra et al. |
| 2008/0215396 A1 | 9/2008 | Greenstein et al. |
| 2011/0106722 A1 | 5/2011 | Angell et al. |
| 2016/0371621 A1 | 12/2016 | Angell et al. |

FOREIGN PATENT DOCUMENTS

| | | |
|---|---|---|
| JP | 2005-285093 A | 10/2005 |
| JP | 2007-048315 A | 2/2007 |

OTHER PUBLICATIONS

Fathi K. Abdelsalam, USPTO Office Action, U.S. Appl. No. 12/610,999, dated Mar. 17, 2011, 15 pages.
Fathi K. Abdelsalam, USPTO Final Office Action, U.S. Appl. No. 12/610,999, dated Nov. 23, 2011, 9 pages.
Fathi K. Abdelsalam, USPTO Office Action, U.S. Appl. No. 12/610,999, dated Mar. 23, 2012, 10 pages.
Fathi K. Abdelsalam, USPTO Final Office Action, U.S. Appl. No. 12/610,999, Notification dated May 15, 2013, 11 pages.
USPTO Office Action, U.S. Appl. No. 12/610,999, Notification dated Jul. 29, 2014, 22 pages.
USPTO Final Office Action, U.S. Appl. No. 12/610,999, Notification dated Feb. 26, 2015, 18 pages.
USPTO Office Action, U.S. Appl. No. 12/610,999, Notification Date Sep. 24, 2015, 17 pages.
USPTO Final Office Action, U.S. Appl. No. 12/610,999, Notification dated Apr. 21, 2016, 7 pages.
USPTO Office Action, U.S. Appl. No. 15/256,825, Notification dated Dec. 14, 2018, 17 pages.
USPTO Notice of Allowance and Fees Due, U.S. Appl. No. 15/256,825, dated Apr. 3, 2019, 15 pages.

COMPARING UTILITY AND WARRANTY OF SERVICES

RELATED U.S. APPLICATION DATA

The present patent document is a continuation of U.S. patent application Ser. No. 15/256,825, filed Sep. 6, 2016, U.S. patent application Ser. No. 15/256,825 is a continuation of U.S. patent application Ser. No. 12/610,999, filed Nov. 2, 2009, U.S. Pat. No. 9,483,746 B2, issued Nov. 1, 2016 entitled "COMPARING UTILITY AND WARRANTY OF SERVICES." The entire contents of Ser. No. 15/256,825 and Ser. No. 12/610,999 are is incorporated herein by reference.

FIELD OF THE INVENTION

The present invention relates generally to business services, and more specifically, to comparing utility and warranty of services for a business process.

BACKGROUND OF THE INVENTION

Distributed environments such as clusters of computing systems, data centers, and grid systems involve managing a large number of resources and service components. Typical end-service provided to the users of such systems require composition of multiple resources and service components, which together deliver the end-service that is of interest to the users. Such composition of multiple components requires careful configuration of the components and deployment of these components, such that they interface with each other in a compatible manner so that the composite service is deployed, initialized, handles the workload submitted by users, handles component level faults, and provides robust service while handling fluctuations in the workload.

In the past, IT solution architectures have attempted to deal with increasing levels of software and hardware complexity. Many businesses use business processes that comprise one or more services, typically implemented by software that is deployed on hardware, which is housed in a datacenter. As the level of complexity continues to increase, traditional solution development techniques are reaching the limit of their ability to adequately design the IT Infrastructure that supports the multiplicity of business functions that rely on shared IT resources. Determining how well the IT infrastructure satisfies these IT service requirements becomes increasingly difficult, especially as resources are integrated and shared within an IT implementation. Currently, there is no uniform way to compare implementations choices that accounts for the sharing of resources across the layers of the IT infrastructure.

SUMMARY OF THE INVENTION

In one embodiment, there is a method for comparing utility and warranty of services in an information technology (IT) stack comprising a plurality of layers, at least one of the layers having a set of services. In this embodiment, the method comprises: determining, at each layer of the IT stack, a required utility and warranty (RUW) value for each of the set of services, wherein the RUW value represents a desired solution for implementing a business process; determining, at each layer of the IT stack, an available utility and warranty (AUW) value for each of the set of services, wherein the AUW value is a measure of an ability of each of the set of services to satisfy the RUW at each layer of the IT stack; and comparing the RUW value against the AUW value at each layer of the IT stack to determine whether each of the set of services satisfies the desired solution for implementing the business process.

In a second embodiment, there is a system for comparing utility and warranty of services in an information technology (IT) stack comprising a plurality of layers, at least one of the plurality of layers having a set of services. In this embodiment, the system comprises at least one processing unit, and memory operably associated with the at least one processing unit. A utility and warranty tool is storable in memory and executable by the at least one processing unit. The utility and warranty tool comprises: a determination component configured to determine, at each layer of the IT stack, a required utility and warranty (RUW) value for each of the set of services, wherein the RUW value represents a desired solution for implementing a business process; and determine, at each layer of the IT stack, an available utility and warranty (AUW) value for each of the set of services, wherein the AUW value is a measure of an ability of each of the set of services to satisfy the RUW at each layer of the IT stack. The utility and warranty further comprises a comparison component configured to compare the RUW value against the AUW value at each layer of the IT stack to determine whether each of the set of services satisfies the desired solution for implementing the business process.

In a third embodiment, there is a computer-readable medium storing computer instructions, which when executed, enables a computer system to compare utility and warranty of services in an information technology (IT) stack comprising a plurality of layers, at least one of the plurality of layers having a set of services, the computer instructions comprising: determining, at each layer of the IT stack, a required utility and warranty (RUW) value for each of the set of services, wherein the RUW value represents a desired solution for implementing a business process; determining, at each layer of the IT stack, an available utility and warranty (AUW) value for each of the set of services, wherein the AUW value is a measure of an ability of each of the set of services to satisfy the RUW at each layer of the IT stack; and comparing the RUW value against the AUW value at each layer of the IT stack to determine whether each of the set of services satisfies the desired solution for implementing the business process.

In a fourth embodiment, there is a method for comparing utility and warranty of services in an information technology (IT) stack comprising a plurality of layers, at least one of the plurality of layers having a set of services. In this embodiment, a computer infrastructure is provided and is operable to: determine, at each layer of the IT stack, a required utility and warranty (RUW) value for each of the set of services, wherein the RUW value represents a desired solution for implementing a business process; determine, at each layer of the IT stack, an available utility and warranty (AUW) value for each of the set of services, wherein the AUW value is a measure of an ability of each of the set of services to satisfy the RUW at each layer of the IT stack; and compare the RUW value against the AUW value at each layer of the IT stack to determine whether each of the set of services satisfies the desired solution for implementing the business process.

Figure 1:
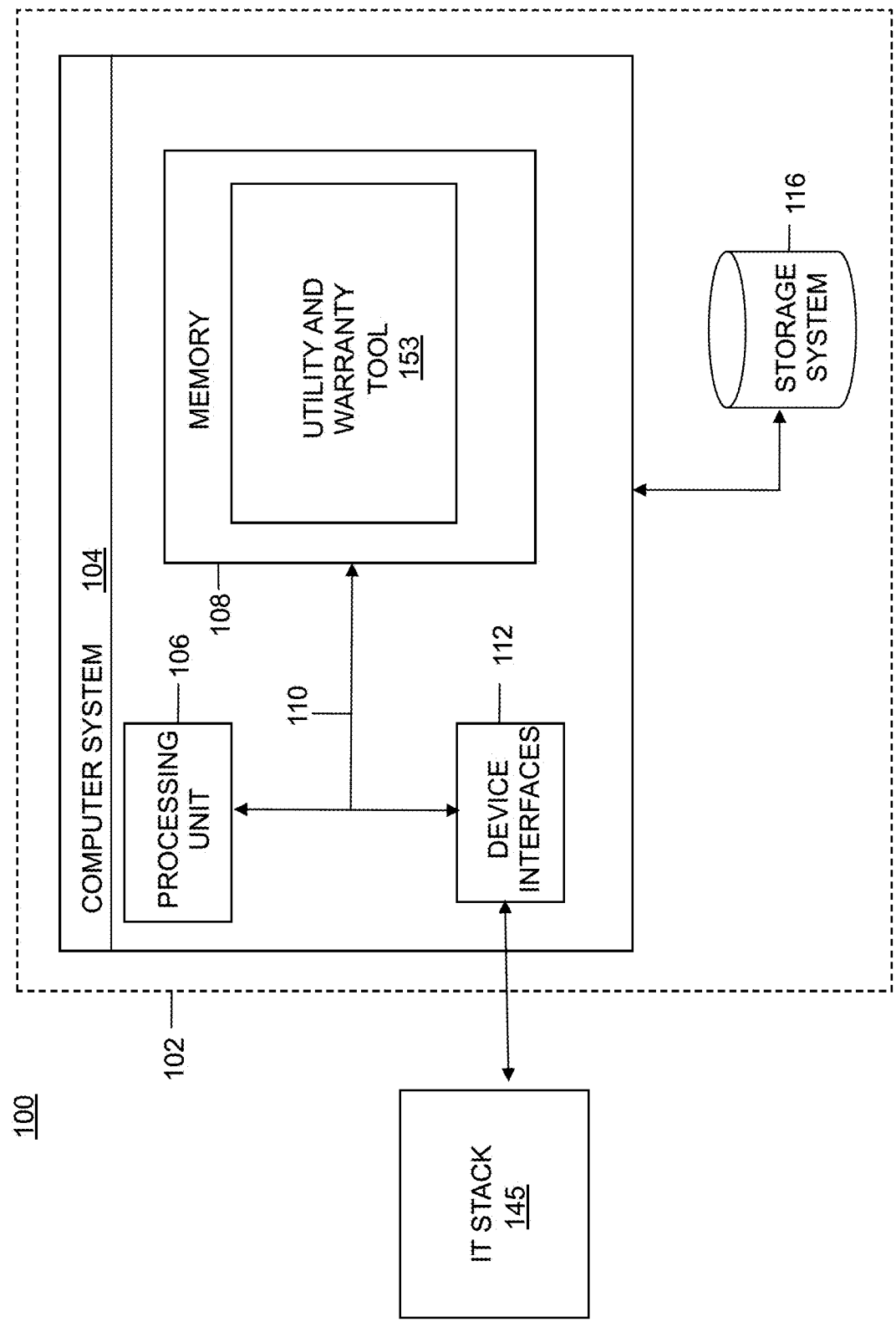
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to comparing utility and warranty of services in an information technology (IT) stack comprising a plurality of layers, at least one of the plurality of layers having a set (i.e., one or more) of services. In these embodiments, a utility and warranty tool provides this capability. Specifically, the utility and warranty tool comprises a determination component configured to determine, at each layer of the IT stack, a required utility and warranty (RUW) value for each of the set of services, wherein the RUW value represents a desired solution for implementing a business process; and determine, at each layer of the IT stack, an available utility and warranty (AUW) value for each of the set of services, wherein the AUW value is a measure of an ability of each of the set of services to satisfy the RUW at each layer of the IT stack. The utility and warranty tool further comprises a comparison component configured to compare the RUW value against the AUW value at each layer of the IT stack to determine whether each of the set of services satisfies the desired solution for implementing the business process.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the process of the present invention for others.

Computer system 104 is intended to represent any type of computer system that may be implemented in deploying/realizing the teachings recited herein. In this particular example, computer system 104 represents an illustrative system for generating a coding scheme for comparing utility and warranty of services in an information technology (IT) stack 145. It should be understood that any other computers implemented under the present invention may have different components/software, but will perform similar processes. As further shown, computer system 104 includes a processing unit 106 capable of analyzing and comparing data representing the RUW and AUW, as will be further described below. Also shown is memory 108 for storing a utility and warranty tool 153, a bus 110, and device interfaces 112.

Processing unit 106 collects and routes signals representing data collected from IT stack 145 and utility and warranty tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the data may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating utility and warranty tool 153, which is stored in memory 108 and/or storage system 116. While executing computer program code, processing unit 106 can read and/or write data to/from memory 108 and storage system 116. It will be appreciated that storage system 116 can include VCRs, DVRs, RAID arrays, USB hard drives, optical disk recorders, flash storage devices, general purpose computers, and/or other data processing and storage elements for storing and/or processing data.

Figure 2:
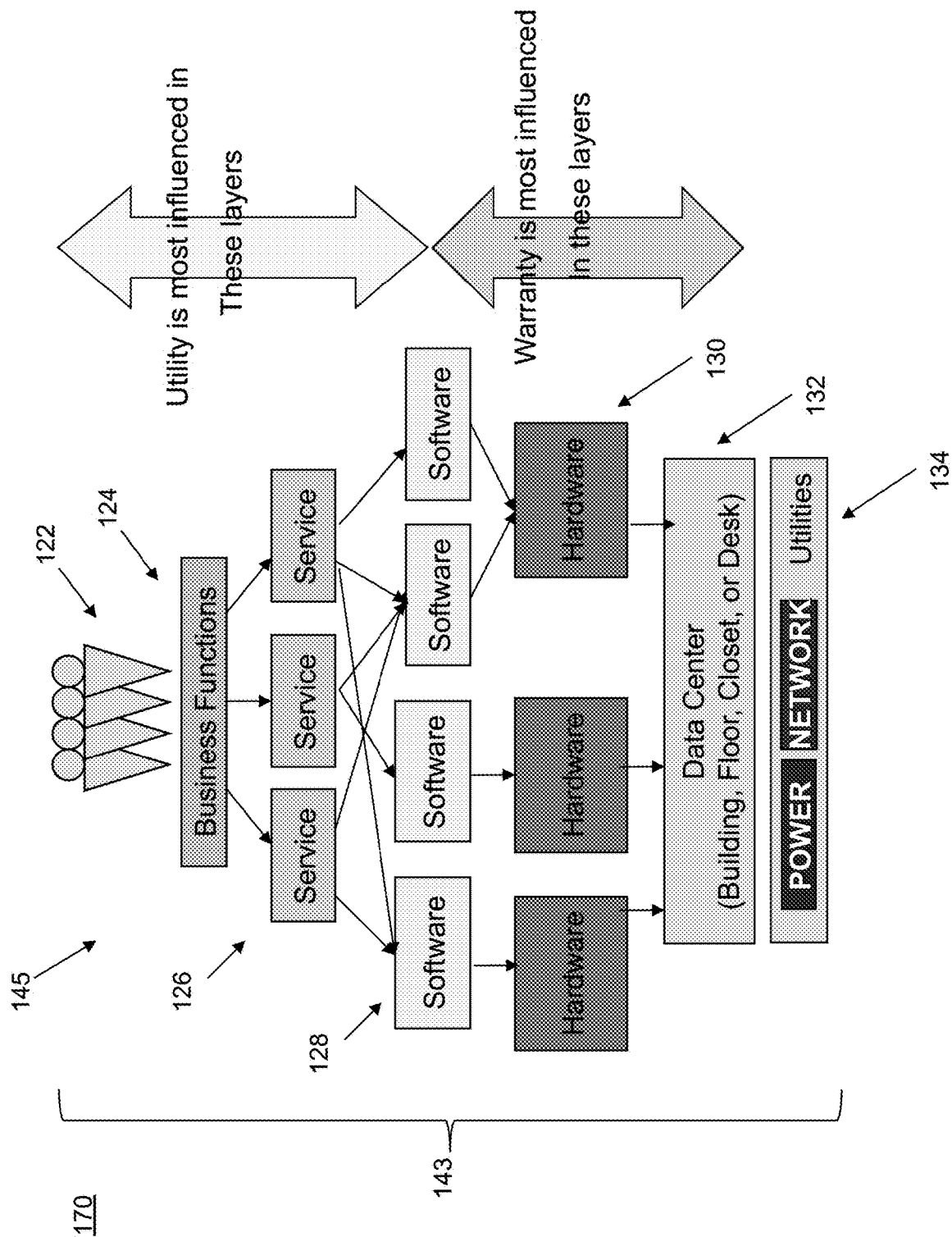
FIG. 2 shows an IT stack according to embodiments of the invention.
Figure 3:
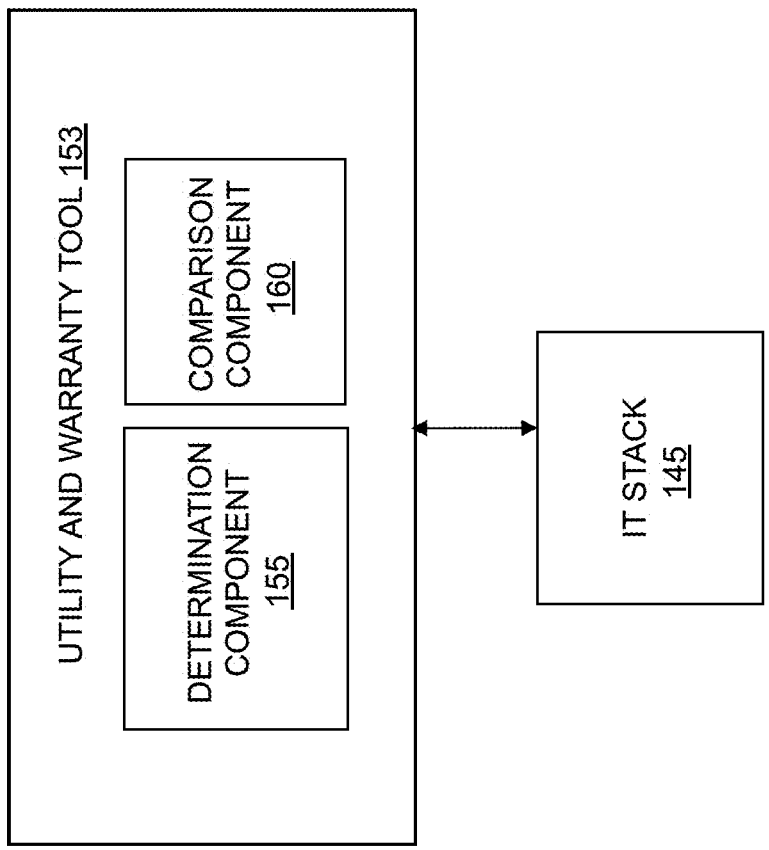
FIG. 3 shows a utility and warranty tool that operates in the environment shown in FIG. 1.

FIGS. 2-3 show a more detailed view of utility and warranty tool 153 according to embodiments of the invention. Utility and warranty tool 153 operates with IT stack 145, which comprises a plurality of layers 143 representing requirements of a business process 170. As shown in FIG. 2, IT stack 145 comprises a set of end users 122 performing one or more business functions 124 (i.e., purchase order processing, invoice reconciliation, scheduling and dispatching service personnel, determining truck delivery routes, managing warehouse inventory, etc.). Execution of business functions 124 depends on each layer of IT stack 145, including set of services 126, a set of software components 128, a set of hardware components 130 operating with a data center 132, and power/network utilities 134. From the perspective of an end user 122, utility (i.e., a desired mapping solution between the components of an IT stack for implementing a business process) is driven top-down, as utility is most influential in the business function 124 layer and set of services 126 layer. The mapping of desired solution requirements focuses more on choosing a combination of software capabilities. As shown, warranty (i.e., how well a service satisfies the desired solution) is driven from the bottom up and more influenced by the set of hardware components 130 layer and the data center 132 layer. In this embodiment, the deployment patterns of various software combinations focuses on warranty.

As shown in FIGS. 2-3, utility and warranty tool 153 comprises a determination component 155 (FIG. 3) configured to determine, at each layer 143 of IT stack 145, a required utility and warranty (RUW) value for each of a set of services 122, wherein the RUW value represents a desired solution for implementing business process 170. Determination component 155 is further configured to determine, at each layer 143 of IT stack 145, an available utility and warranty (AUW) value for each of set of services 122, wherein the AUW value is a measure of an ability of each of set of services 122 to satisfy the RUW at each layer 143 of IT stack 145. Specifically, determination component 155 calculates the RUW value at each layer 143 of IT stack 145 starting with an end user 122 layer of IT stack 145 and moving towards a data center 132 layer of IT stack 145. Determination component 155 also calculates the AUW value at each layer of IT stack 145 starting with data center 132 layer of IT stack 145 and moving towards end user 122 layer of IT stack 145. In this way, the RUW values are calculated moving "downward," while the AUW values are calculated moving "upward."

The AUW and the RUW calculations account for the influences of sharing among various components of IT stack 145, as resource sharing creates multiple paths between components. Resource sharing results in a collection of possible RUW and AUW for comparison at that component, the selection of which is driven by area/components to maximize or minimize across the IT stack 145. For example, to maximize the potential for each component in IT Stack 145 to at least satisfy the RUW when a component is shared, the most demanding RUWs is propagated downward, while the best AUW is propagated upward. However, this selection process can also take into account global requirements outside of the requirements driven from the interconnection of the components (i.e., floor space in the datacenter, power in the datacenter, skills of the datacenter operations, security boundaries in the datacenter, etc.).

In one embodiment, the RUW value and the AUW value are calculated using a mathematical model. Specifically, determination component 155 is configured to calculate both the RUW and the AUW values using any number of mathematical models including, but not limited to: dynamical systems, statistical systems, differential equations, etc. Or, in another embodiment, determination component is configured to calculate the RUW value and the AUW value using actual observed values. In this approach, the behavior of a given node in IT stack 145 is compared over time to some known condition (i.e., a controlled laboratory benchmark test), or against current conditions (i.e., monitoring a production datacenter) to provide the RUW or AUW values for a given component of IT stack 145. The determination component 155 is capable of handling a mixture of component types, where the type is the mechanism by which the RUW and/or AUW value is derived.

Next, a comparison is made between the RUW and AUW values calculated for each of plurality of layers 143. Specifically, utility and warranty tool 153 comprises a comparison component 160 configured to compare the RUW value against the AUW value at each layer 143 of IT stack 145 to determine whether each of set of services 126 satisfies the desired solution for implementing business process 170. That is, at each layer of IT stack 145, the RUW is compared against the AUW to provide a measure of how well, at each point in business process 170, the desired solution satisfies the RUW. A positive comparison (i.e., AUW value is greater than RUW value) indicates that the desired solution has excess available utility or warranty, while a negative comparison indicates that the desired solution is not meeting all requirements, and that another solution may be needed.

Figure 4:
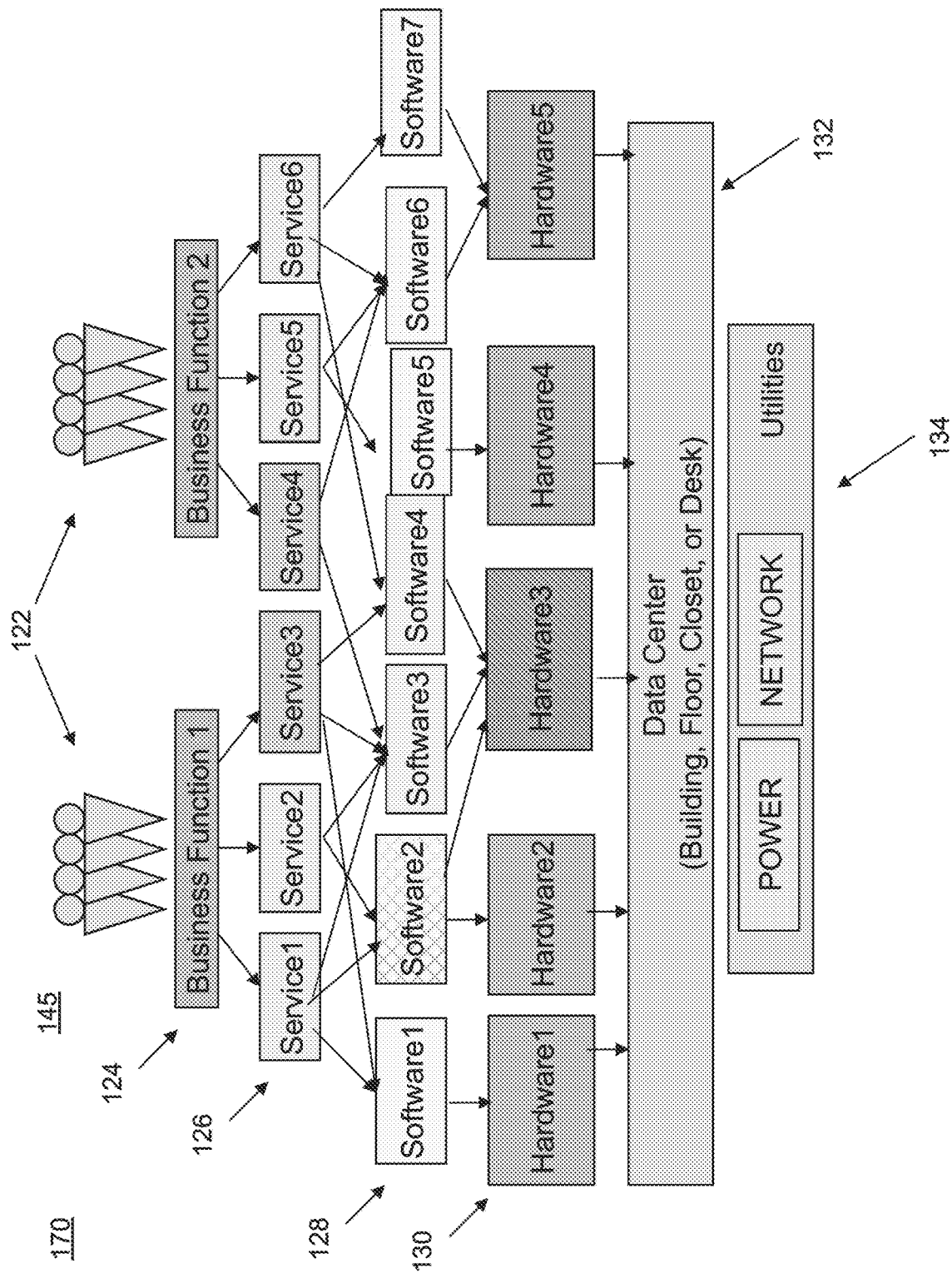
FIG. 4 shows an approach for comparing utility and warranty of services of an IT stack according to embodiments of the invention.

Referring now to FIG. 4, an approach for comparing utility and warranty of services in IT stack 145 will be described in further detail. As mentioned above, determination component 155 (FIG. 3) calculates the RUW value at each layer of IT stack 145 starting with an end user 122 layer of IT stack 145 and moving towards data center 132 layer of IT stack 145. A "downward view" of FIG. 4 shows that Business Function 1 is made up of services 1, 2, and 3, while Business Function 2 is made up of services 4, 5 and 6. In this example, Service 3 is made up of Software 3 and Software 4, while Service 4 is made up of Software 3 and Software 6. Further, Service 3 and Service 4 run on Hardware 3. An "upward view" shows that Hardware 3 hosts Software 3, Software 3, and Software 4. Therefore, Hardware 3 must satisfy the most constraining RUW of Softwares 1, 2, 3, and 4. As shown, Software 3 is used by Service 1, Service 2, Service 3, and Service 4. For the case where the objective is to meet the RUW without any other external constraints, Software 3 must then satisfy the most constraining RUW of Services 1, 2, and 3. Furthermore, Software 4 is used by Service 3 and Service 6 and must satisfy the most constraining RUW of services 3 and 6. Accordingly, Service 3 is used by Business Function 1 and must satisfy the RUW of Business Function 1.

RUW and AUW calculations according to the present invention are based on many factors throughout the business process, as well as factors external to the business process (i.e., floor space, network bandwidth, software change control processes, datacenter maintenance policies, etc). In the example in FIG. 4, one such focus could be on the constraint of component availability. Here, Business Function 1 must be available 24 hours a day, 7 days a week for the entire year (i.e., "24×7×365"), for example, while Business Function 2 must be available 8 hours a day, 5 days a week for 52 weeks (i.e., "8×5×52"). Therefore, at the services layer, Service 3 must be available 24×7×365 and Service 4 must be available 8×5×52. Moving down to the software layer, it is appreciated that Software 3 and Software 4 must also be available 24×7×365, as they both support Service 3. Accordingly, Hardware 3, data center 132, and any incoming utilities 143 must be able to provide support 24×7×365 as well. As shown, Software 2, requiring 24×6×52 availability, can be hosted on Hardware 3, which has 24×7×365 availability. The present invention examines other external factors as well. In this example, comparison component 160 examines the requirements of the change control process for Software 2 vs. Software 3 and Software 4. Softwares 3 and 4, designed for 24×7×365 availability, do not require the hosting hardware to be powered off/on for any change. Software 2, designed for 24×6×52, requires the hosting hardware to be powered off/on. As such, the solution is identified as not meeting requirements. In this example, Software 2 can provide 24×6×52 availability without the on/off requirement, but has not been utilized. Therefore, Hardware 3 is only available 24×6×52, which is less than the required 24×7×365. As mentioned above, Software 4 and Software 5 can provide 24×7×365 availability and thus identifies two potential places to correct the utility and warranty mismatch. The comparison has determined that the desired solution for implementing the business process will not be satisfied. One possibility to correct this would be to upgrade Software 2, which will require upgrading Service 1 and Service 2. Alternatively, a second instance of Hardware 3, can be deployed, one hosting Software 2, the other hosting Softwares 3 and 4.

It can be appreciated that the methodologies disclosed herein can be used within a computer system to compare utility and warranty of services, as shown in FIG. 1. In this case, utility and warranty tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 5:
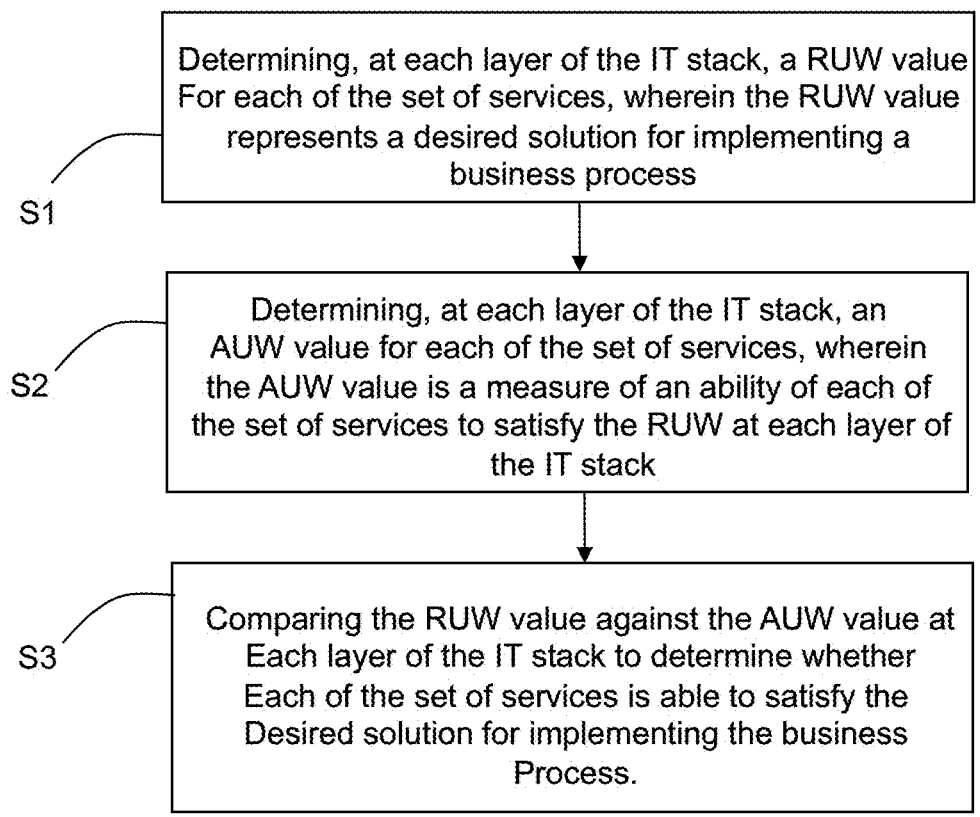
FIG. 5 shows a flow diagram of a method for comparing utility and warranty of services of an IT stack according to embodiments of the invention.

The program modules carry out the methodologies disclosed herein, as shown in FIG. 5. According to one embodiment, at S1, the RUW value is determined at each layer of the IT stack for each of the set of services, wherein the RUW value represents a desired solution for implementing a business process. At S2, the AUW value is determined at each layer of the IT stack for each of the set of services, wherein the AUW value is a measure of an ability of each of the set of services to satisfy the RUW at each layer of the IT stack. At S3, the RUW value is compared against the AUW value at each layer of the IT stack to determine whether each of the set of services satisfies the desired solution for implementing the business process. As such, this method makes it possible to compare alternate desired solutions against each other in a standardized manner.

The flowchart of FIG. 5 illustrates the architecture and operation of possible implementations of systems, methods and computer program products according to various embodiments of the present invention. In this regard, each block in the flowchart may represent a module, segment, or portion of code, which comprises one or more executable instructions for implementing the specified logical process(s). It should also be noted that, in some alternative implementations, the process noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified process or acts, or combinations of special purpose hardware and computer instructions.

Furthermore, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for comparing utility and warranty of services in an information (IT) stack comprising a plurality of layers, at least one of the plurality of layers having a set of services. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A computer implemented method for comparing utility and warranty of services in an information technology (IT) stack, the computer implemented method comprising:

calculating, at layers of the IT stack, a required utility and warranty (RUW) value for each of a set of services, by starting with an end user layer of the IT stack and continuing towards a data center layer of the IT stack, wherein the RUW value is determined from component availability, wherein the RUW value represents a desired solution for implementing a business process;

calculating, at the layers of the IT stack, an available utility and warranty (AUW) value for each of the set of services by starting with the data center layer of the IT stack and continuing towards the end user layer of the IT stack, wherein the AUW value is determined from component availability, wherein the AUW value is a measure of an ability of each of the set of services to satisfy the RUW value at each layer of the IT stack;

comparing the RUW value against the AUW value for each of the layers of the IT stack to determine whether each of the set of services satisfies the desired solution for implementing the business process; and when the comparison determines that each of the set of services does not satisfy the desired solution for implementing the business process, modifying one or more components of the IT stack.

2. The method of claim 1, wherein the calculating the RUW value is based on a mathematical model.

3. The method of claim 2, wherein the mathematical model is one of dynamical systems, statistical systems, or differential equations.

4. The method of claim 1, wherein the calculating the AUW value is based on a mathematic model.

5. The method of claim 4, wherein the mathematical model is one of dynamical systems, statistical systems, or differential equations.

6. The method of claim 1, wherein the calculating the RUW value and the calculation of the AUW value are each based on actual observed values.

7. The method of claim 1, wherein the calculating the RUW value and the calculation of the AUW value are each based on at least one of floor space, network bandwidth, software change control processes, or datacenter maintenance policies.

8. A system for comparing utility and warranty of services in an information technology (IT) stack comprising a plurality of layers, at least one of the plurality of layers having a set of services, the system comprising:
at least one processing unit;
memory operably associated with the at least one processing unit; and
a utility and warranty tool storable in memory and executable by the at least one processing unit, the utility and warranty tool comprising:
a determination component configured to:
calculate, at layers of the IT stack, a required utility and warranty (RUW) value for each of the set of services, by starting with an end user layer of the IT stack and continuing towards a data center layer of the IT stack, wherein the RUW value is determined from component availability, wherein the RUW value represents a desired solution for implementing a business process;
calculate, at the layers of the IT stack, an available utility and warranty (AUW) value for each of the set of services by starting with the data center layer of the IT stack and continuing towards the end user layer of the IT stack, wherein the AUW value is determined from component availability, wherein the AUW value is a measure of an ability of each of the set of services to satisfy the RUW value at each layer of the IT stack;
a comparison component configured to compare the RUW value against the AUW value for each of the layers of the IT stack to determine whether each of the set of services satisfies the desired solution for implementing the business process.

9. The utility and warranty tool according to claim 8, wherein the calculation of the RUW value is based on a mathematical model.

10. The utility and warranty tool according to claim 9, wherein the mathematical model is one of dynamical systems, statistical systems, or differential equations.

11. The utility and warranty tool according to claim 8, wherein the calculation of the AUW value is based on a mathematical model.

12. The utility and warranty tool according to claim 11, wherein the mathematical model is one of dynamical systems, statistical systems, or differential equations.

13. The utility and warranty tool according to claim 8, wherein the calculation of the RUW value and the calculation of the AUW value are each based on actual observed values.

14. The utility and warranty tool according to claim 8, wherein the calculation of the RUW value and the calculation of the AUW are each based on at least one of floor space, network bandwidth, software change control processes, or datacenter maintenance policies.

15. A computer-readable hardware storage device storing computer instructions, which when executed, enables a computer system to compare utility and warranty of services in an information technology (IT) stack comprising a plurality of layers, at least one of the layers having a set of services, the computer instructions comprising:
calculate, at layers of the IT stack, a required utility and warranty (RUW) value for each of the set of services, by starting with an end user layer of the IT stack and continuing towards a data center layer of the IT stack, wherein the RUW value is determined from component availability, wherein the RUW value represents a desired solution for implementing a business process;
calculate, at the layers of the IT stack, an available utility and warranty (AUW) value for each of the set of services by starting with the data center layer of the IT stack and continuing towards the end user layer of the IT stack, wherein the AUW value is determined from component availability, wherein the AUW value is a measure of an ability of each of the set of services to satisfy the RUW value at each layer of the IT stack;
compare the RUW value against the AUW value for each of the layers of the IT stack to determine whether each of the set of services satisfies the desired solution for implementing the business process; and
when the comparison determines that each of the set of services does not satisfy the desired solution for implementing the business process, modifying one or more components of the IT stack.

16. The computer-readable hardware storage device according to claim 15, wherein the calculation of the RUW value is based on a mathematical model.

17. The computer-readable hardware storage device according to claim 16, wherein the mathematical model is one of dynamical systems, statistical systems, or differential equations.

18. The computer-readable hardware storage device according to claim 15, wherein the calculation of the AUW value is based on a mathematical model.

19. The computer-readable hardware storage device according to claim 15, wherein the calculation of the RUW value and the calculation of the AUW value are each based on actual observed values.

20. The computer-readable hardware storage device according to claim 15, wherein the calculation of the RUW value and the calculation of the AUW value are each based on at least one of floor space, network bandwidth, software change control processes, or datacenter maintenance policies.

* * * * *